(12) United States Patent
Nock et al.

(10) Patent No.: US 6,353,897 B1
(45) Date of Patent: Mar. 5, 2002

(54) OBJECT ORIENTED APPARATUS AND METHOD FOR TESTING OBJECT ORIENTED SOFTWARE

(75) Inventors: Clifton Malcolm Nock; Frances Ellen Stewart; Andrew Thomas Tauferner; Lisa Shaine-Marie Wellman, all of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/226,072

(22) Filed: Jan. 6, 1999

(51) Int. Cl.[7] .............................................. G06F 11/00
(52) U.S. Cl. ..................................................... 714/38
(58) Field of Search ................................ 714/38; 717/4

(56) References Cited

U.S. PATENT DOCUMENTS

| | | | | |
|---|---|---|---|---|
| 5,708,774 A | * | 1/1998 | Boden ........................... | 714/38 |
| 5,745,675 A | | 4/1998 | Herbig et al. ........... | 395/183.14 |
| 5,781,720 A | * | 7/1998 | Parker ........................... | 714/38 |
| 5,794,043 A | * | 8/1998 | Kolb ............................. | 717/4 |
| 5,799,266 A | * | 8/1998 | Hayes ........................ | 702/123 |
| 5,987,247 A | * | 11/1999 | Lau ............................... | 717/4 |
| 6,031,990 A | * | 2/2000 | Sivakumar ..................... | 717/4 |
| 6,182,245 B1 | * | 1/2001 | Akin ............................ | 714/38 |
| 6,219,829 B1 | * | 4/2001 | Sivakumar ..................... | 717/4 |

* cited by examiner

*Primary Examiner*—Robert Beausoleil
*Assistant Examiner*—Bryce P Bonzo
(74) *Attorney, Agent, or Firm*—Martin & Associates, LLC; Derek P. Martin

(57) ABSTRACT

An apparatus and method for testing object oriented software includes a software test framework that includes one or more test drivers and one or more testcases for each test driver. Each testcase can also have multiple variations. A TestDriver abstract class and a Testcase class are defined. Each test driver is created as an extension of the TestDriver class, and each testcase is created as an extension of the Testcase class, thereby promoting uniformity between different test drivers and between different test cases. When an instance of the TestDriver class is run, it instantiates its testcases, determines which variations of the testcases should be run, runs the variations, and reports the results. By providing the software test framework in the same programming environment in which the software under test is developed, the application programmer can program the needed tests without requiring the specialized skills of a test programmer.

28 Claims, 5 Drawing Sheets

OBJECT ORIENTED APPARATUS AND METHOD FOR TESTING OBJECT ORIENTED SOFTWARE

BACKGROUND OF THE INVENTION

1. Technical Field

The present invention relates in general to the data processing field. More specifically, the present invention relates to the field of testing object oriented software.

2. Background Art

The development of the EDVAC computer system of 1948 is often cited as the beginning of the computer era. Since that time, computer systems have evolved into extremely sophisticated devices. Modem computer systems contain relatively complex software that the computer hardware executes in order for the computer system to perform its intended functions. As the complexity of computer software increases, the need to test computer software becomes more and more critical.

In the past, testing computer software required that a programmer write special-purpose test code that would perform the desired testing. For the purpose of clarity in the discussion below, the term "test code" refers to software that is developed to test other software; the term "software under test" refers to software that is being tested by the test code; the term "test programmer" refers to the programmer that programs the test code; and the term "application programmer" refers to the programmer that programs the software under test. Note that the term "application programmer" should not be construed to mean that the software under test can only be a software application; rather, the software under test can be any type of computer software, including applications, system software, or any other type of software. The term "application programmer" is simply a label used to identify a person that develops software under test, regardless of what type of software under test is being developed. In the prior art, when an application programmer generates new software that needs to be tested, a test programmer who is familiar with software testing techniques generates special test code that performs the desired testing on the software under test to assure the software under test functions properly. This test code is typically special-purpose code, generated for testing specific software on a particular platform. As the diagnostic requirements change, the test programmer generally writes new code for each new requirement, and deletes the code that pertains to tests that are no longer needed. An example of test code development may be illustrated by a simple example. When a new software application is initially developed, the various modules of the application may be developed separately, with each one being individually tested before integrating the various modules into a functioning application. A test programmer would generate test code that will provide the required diagnostics on each module. Once the various modules are integrated into a single application, the test programmer would provide a fully integrated diagnostic test to test the entire software application. The testing of the software in this stage is for the purpose of design and functional verification, and the test code will thus perform exhaustive diagnostics on all portions of the software under test to assure the integrity of its design. Once the design is verified, as the software under test is released for sale, the test software must evolve again to accommodate the more time-sensitive and less exhaustive diagnostics required in production screening and testing. The test programmer must then pare down the test code to perform the less exhaustive tests for production testing of the software under test.

The process of generating test code has been burdensome. Generally the test programmer starts from scratch, defining custom test code to match the specific requirements of the software under test and the platform running the software under test. As changes to the software under test are required, the programmer makes changes to the test code to accommodate those changes. When the project concludes, the test code generally cannot be reused on different software under test, such as a new software application, because the specific interface and test requirements are generally different enough to preclude porting the test code to new applications. As a result, test code to date has generally not been readily customizable and easily extendable to testing new software.

Another problem in testing software is the difference between developing a software application and testing the software application. Software is often tested in a language and environment that is different from those used to develop and maintain the software. As a result, many skills, tools, and paradigms from the development realm are not reusable in the testing realm, and vice versa. This is the reason that two different kinds of programmers must generally be used to develop and test software. Application programmers design and develop the software under test. Test programmers design, develop, and run the test applications on the software under test. The tools that test programmers use may be in a different language and may have nothing in common with the tools used by the application programmers to develop the software under test. This environment makes it difficult for an application programmer to test his or her application software, and requires instead that a separate person with a different set of skills be used to test application software.

Yet another problem in testing software is that test code is typically poorly documented, and the documentation that does exist, such as test plans, strategies, user's guides, and the like, tends to become obsolete because the documentation is not scrupulously updated as the test code evolves over time. Thus, it is not uncommon for test code documentation to not accurately reflect the function of the test code.

As the complexity of computer software increases, the need for better mechanisms for software testing becomes more apparent and more acute. Without a mechanism that can be readily customized and extended to generate new software tests in a uniform manner, the ability to adequately test computer software in a cost-effective manner will be impaired.

DISCLOSURE OF INVENTION

According to the present invention, an apparatus and method for testing object oriented software includes a software test framework that includes one or more test drivers and one or more testcases for each test driver. Each testcase can also have multiple variations. A TestDriver abstract class and a Testcase class are defined. Each test driver is a created as an extension of the TestDriver class, and each testcase is created as an extension of the Testcase class, thereby promoting uniformity between different test drivers and between different test cases. When an instance of the TestDriver class is run, it instantiates its testcases, determines which variations of the testcases should be run, runs the variations, and reports the results. By providing the software test framework in the same programming environment in which the software under test is developed, the application programmer can program the needed tests without requiring the specialized skills of a test programmer.

The foregoing and other features and advantages of the invention will be apparent from the following more particular description of preferred embodiments of the invention, as illustrated in the accompanying drawings.

BEST MODE FOR CARRYING OUT THE INVENTION

Overview—Object-Oriented Technology

Figure 1:
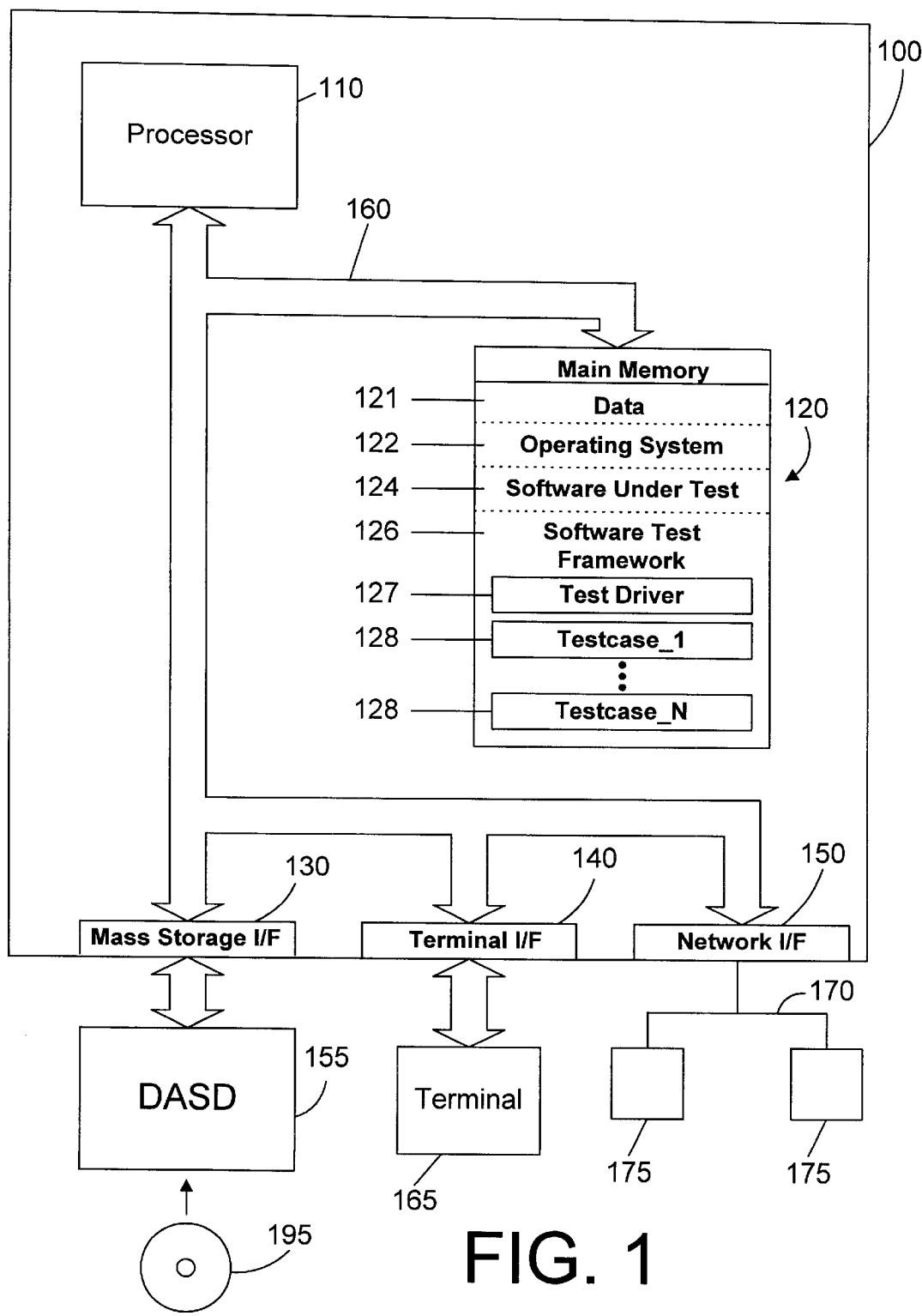
FIG. 1 is a block diagram of an apparatus in accordance with a preferred embodiment of the present invention.

The present invention was developed using object oriented (OO) technology. Individuals skilled in the art of OO technology may wish to proceed to the Detailed Description section of this specification. However, those individuals who are new to OO technology should read this overview section in order to best understand the benefits and advantages of the present invention.

Object Oriented Technology v. Procedural Technology

In general, OO technology is significantly different than conventional, process-based technology (often called procedural technology). While both technologies can be used to solve the same problem, the ultimate solutions to the problem are always quite different. This difference stems from the fact that the design focus of procedural technology is wholly different than that of OO technology. The focus of process-based design is on the overall process that solves the problem; whereas, the focus of OO design is on how the problem can be broken down into a set of autonomous entities that can work together to provide a solution. The autonomous entities of OO technology are called objects. Said another way, OO technology is significantly different from procedural technology because problems are broken down into sets of cooperating objects instead of into hierarchies of nested computer programs or procedures.

The Term Framework

There has been an evolution of terms and phrases which have particular meaning to those skilled in the art of OO design. However, the reader should note that one of the loosest definitions in the OO art is the definition of the word framework. The word framework means different things to different people. Therefore, when comparing the characteristics of two supposed framework mechanisms, the reader should take care to ensure that the comparison is indeed "apples to apples." As will become more clear in the forthcoming paragraphs, the term framework is used in this specification to describe an OO mechanism that has been designed to have core function and extensible function. The core function is that part of the framework mechanism that is not subject to modification by a user of the framework. The extensible function, on the other hand, is that part of the framework mechanism that has been explicitly designed to be customized and extended by a user.

OO Framework Mechanisms

While in general terms an OO framework mechanism can be properly characterized as an OO solution, there is nevertheless a fundamental difference between a framework mechanism and a basic OO solution. The difference is that framework mechanisms are designed in a way that permits and promotes customization and extension of certain aspects of the solution. In other words, framework mechanisms amount to more than just a solution to the problem. The mechanisms provide a living solution that can be customized and extended to address individualized requirements that change over time. Of course, the customization/extension quality of framework mechanisms is extremely valuable to users of the framework because the cost of customizing or extending a framework is much less than the cost of replacing or reworking an existing solution.

Therefore, when framework designers set out to solve a particular problem, they do more than merely design individual objects and how those objects interrelate. They also design the core function of the framework (i.e., that part of the framework that is not to be subject to potential customization and extension by the framework consumer) and the extensible function of the framework (i.e., that part of the framework that is to be subject to potential customization and extension). In the end, the ultimate worth of a framework mechanism rests not only on the quality of the object design, but also on the design choices involving which aspects of the framework represent core function and which aspects represent extensible function.

Notation

There is, as yet, no uniformly accepted notation for communicating object-oriented programming ideas. The notation used in this specification is very similar to that known in the programming industry as Booch notation, after Grady Booch. Mr. Booch is the author of *Object-Oriented Analysis and Design With Applications*, 2nd ed. (1994), available from The Benjamin/Cummings Publishing Company, Inc. Use of Booch notation concepts within this specification should not be taken to imply any connection between the inventors and/or the assignee of this patent application and Mr. Booch or Mr. Booch's employer. The notational system used by Mr. Booch is well-known in the art, and is more fully explained at Chapter 5, pp. 171–228 of the aforementioned book.

It bears mention that the Booch notation includes interaction diagrams that trace the execution of objects and classes. Interaction diagrams are essentially restructured object diagrams. That is, interaction diagrams do not convey any additional information from that conveyed by object diagrams, but simply present the same information in a different format. The present specification makes use of an object diagram rather than an interaction diagram, but those skilled in the art will recognize that they are equivalent and also will understand how to convert from one to the other without further explanation.

Detailed Description

According to a preferred embodiment of the present invention, a software test framework includes predefined classes that may be extended by a user to define test code that will operate on object oriented software under test. The user extensions define a test driver and one or more testcases. Each testcase can have multiple variations. The test driver determines which testcases and which variations are to be run, and runs these testcase variations on the software under test. The framework provides a consistent and uniform interface for defining test code that is readily reusable for testing new software. In addition, the framework and user extensions are preferably implemented in the same object oriented programming language as the software under test, making it possible for the programmer that designed and developed the software under test to easily and quickly generate test code using the same development tools.

Referring to FIG. 1, a computer system 100 in accordance with the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device is a readable and writeable optical disk drive, which may store data to and read data from an optical disk 195.

Main memory 120 in accordance with the preferred embodiments contains data 121, an operating system 122, software under test 124, and a software test framework 126. Software test framework 126 includes a test driver 127, and one or more testcases 128. Test driver 127 runs testcases 128 to perform diagnostic testing on the software under test 124. Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, software under test 124, and software test framework 126 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system.

Software under test 124 represents any software program that needs to be tested. Software under test 124 encompasses system-level software such as operating systems and device drivers, application software, and any other form of software. In the preferred embodiments, software under test 124 is software written in a high-level object oriented programming language, such as Smalltalk, C++, or Java.

Software test framework 126 is a framework for generating test code for testing the software under test 124. Software test framework 126 includes predefined classes that are extended by a user to generate user-defined test drivers 127 and testcases 128. The testcases 128 are preferably run under the control of the test driver 127. The logic for the test driver 127 to interact with the testcases 128 is part of the core function of the software test framework 126. This allows a user to avoid the low-level control aspects of diagnostic testing of software, and to spend his or her time developing testcases 128 to thoroughly test the software under test 124.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

It is also important to point out that the presence of network interface 150 within computer system 100 means that computer system 100 may engage in cooperative processing with one or more other computer systems or workstations on network 170. Of course, this in turn means that the programs and data shown in main memory 120 need not necessarily all reside on computer system 100. For example, one or more portions shown in main memory 120 may reside on another system and engage in cooperative processing with one or more objects or programs that reside on computer system 100. This cooperative processing could be accomplished through use of one of the well known client-server mechanisms such as remote procedure call (RPC).

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks, CD ROM, readable/writeable optical disks (e.g., 195 of FIG. 1), and transmission type media such as digital and analog communications links.

Figure 2:
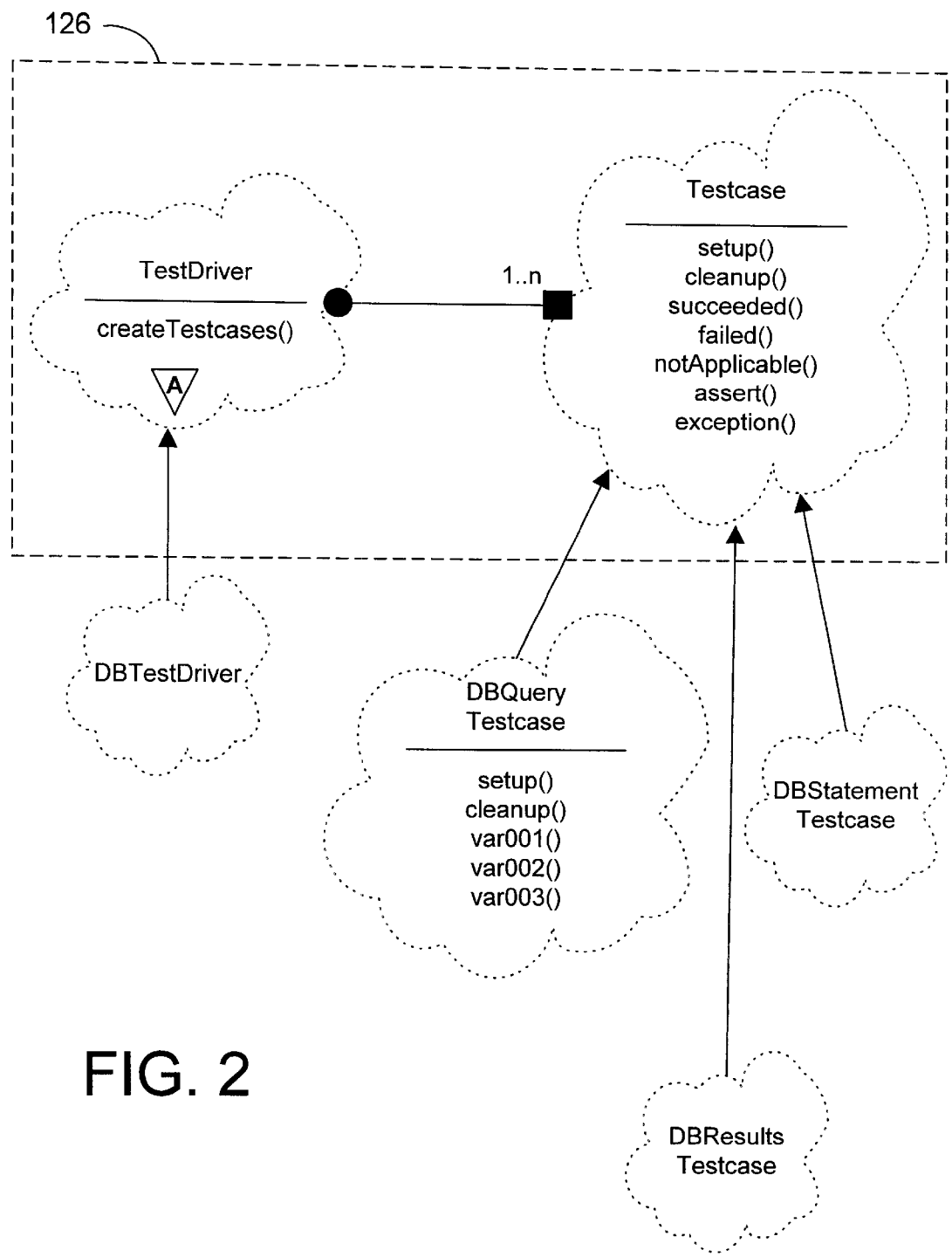
FIG. 2 is a class diagram showing the preferred implementation of the software test framework 126 of FIG. 1 for a sample test driver that contains three sample testcases.

Referring now to FIG. 2, a class diagram shows one specific implementation of the software test framework 126 of FIG. 1 in accordance with a preferred embodiment. Software test framework 126 includes a predefined abstract TestDriver class and a predefined Testcase class. The TestDriver class defines a createTestcases( ) method that allows creating the testcases as required. Note that this method is actually implemented in user-defined extensions to the TestDriver class because the TestDriver class is an abstract class. The Testcase class defines the following methods: setup( ), cleanup( ), succeeded( ), failed( ), notApplicable( ), assert( ), and exception( ). Of these methods, the setup( ) and cleanup( ) methods are preferably not implemented in the Testcase class, but their implementation is instead reserved for the user-defined extensions to the Testcase class. The rest of the methods are preferably implemented in the Testcase class, providing the logic for the core function of the software test framework 126. Of course, these methods may be overridden by a user if the need arises, but most test code generated using software test framework 126 will use the predefined methods on the predefined Testcase class defined in the framework 126. The TestDriver class has a "contains" relationship with the Testcase class that indicates that each TestDriver will have one or more associated Testcases.

The methods for the Testcase class will now be described. As mentioned above, the setup( ) and cleanup( ) are abstract methods that must be implemented by the user. The succeeded( ) method is called to indicate the success of the variation that was just run. The failed( ) method is called to indicate the failure of the variation that was just run. The notApplicable( ) method is called to indicate that the current variation does not apply. The assert( ) method call includes a boolean parameter, and the assert( ) method determines if the boolean condition is true. The exception( ) method call includes a specified exception as a parameter, and determines whether the exception parameter has certain properties. Note that many other methods may be defined on the Testcase class within the scope of the present invention. In addition, the methods discussed above are representative of particular categories of methods that could be defined on the Testcase class, and each category could include multiple discrete methods. For example, there may exist many different assert methods that do different things. The same applies to the other methods on the Testcase class discussed above, that there may actually be many different methods that correspond to each of the methods above. The methods of the Testcase class, along with the class relationship between the TestDriver and Testcase classes, comprise the core function of software test framework 126.

The bottom portion of FIG. 2 shows a sample user extension of framework 126. A class DBTestDriver is a concrete subclass of the TestDriver class, and represents one known way for a user to extend the predefined TestDriver class. For this specific example, we assume that database software is the software under test, and DBTestDriver represents a test driver for running testcases that pertain to database software. The classes DBQueryTestcase, DBResultsTestcase, and DBStatementTestcase are concrete subclasses of the Testcase class, and represent known ways for a user to extend the predefined Testcase class. Each of these testcase classes represent a specific testcase that can be run on the software under test. Some of the methods on the DBQueryTestcase class are shown, including setup( ) and cleanup( ), and also includes a method for each testcase variation defined by DBQueryTestcase. For this example, we assume that three different variations of DBQueryTestcase are available, named var001, var002, and var003. Each of these testcases is run by invoking the methods of the same name, var001( ), var002( ), and var003( ) on the DBQueryTestcase class. No implementation details are provided for the DBResultsTestcase class and the DBStatementTestcase class, but these classes are shown to indicate that multiple testcases typically exist for each test driver. In addition, as shown by the DBQueryTestcase class, multiple variations of each testcase may also exist. The generation of the user extensions to framework 126 and their function may best be understood with reference to the method 300 of FIG. 3.

Method 300 for testing object oriented software in accordance with a preferred embodiment begins by assuming that the software test framework 126 of FIG. 1 is available and ready for use. The first step is to create one or more user-defined extensions of the predefined TestDriver class (step 310). For the example of FIG. 2, the DBTestDriver class is a user-defined extension of the TestDriver class. One way to extend the TestDriver class is to provide a concrete subclass, as shown in FIG. 2. Another way to extend the TestDriver class is to provide a class that implements the TestDriver interface. Other ways of extending the TestDriver class are equally within the scope of the present invention, whether currently known or developed in the future.

Method 300 also requires that the user define one or more extensions of the Testcase class (step 320). For the example of FIG. 2, the DBQueryTestcase, DBResultsTestcase, and DBStatementTestcase represent extensions in the form of concrete subclasses of the Testcase class. Steps 310 and 320 represent the portion of method 300 that sets up the tests to be run. The remaining steps, steps 330, 340, 350 and 360, represent the steps in actually running the testcases that the user defined in steps 310 and 320. To run the testcases, a user-defined extension of the TestDriver class instantiates the testcases that correspond to the extension (step 330). The testcases that correspond to the extension are preferably listed within the extension, and are a subset of all the defined testcases. Note that subset is used in its broadest sense, which means that a set of all the testcases is considered a subset of the same set of all the testcases. Thus, the listed testcases can include any or all of the defined testcases. For the example of FIG. 2, an instance of the DBTestDriver class contains a list of testcases it may invoke, namely DBQueryTestcase, DBResultsTestcase, and DBStatementTestcase. The DBTestDriver instance thus instantiates the classes in its list in step 330. Appropriate variations of these testcases are then run on the software under test (step 340). Finally, the test driver reports the results of running the testcases (step 350). If there are more test drivers that need to run their tests (step 360=YES), method 300 loops back to step 330 to perform more tests. If no more test drivers need to run their tests (step 360=NO), method 300 is done.

Figure 3:
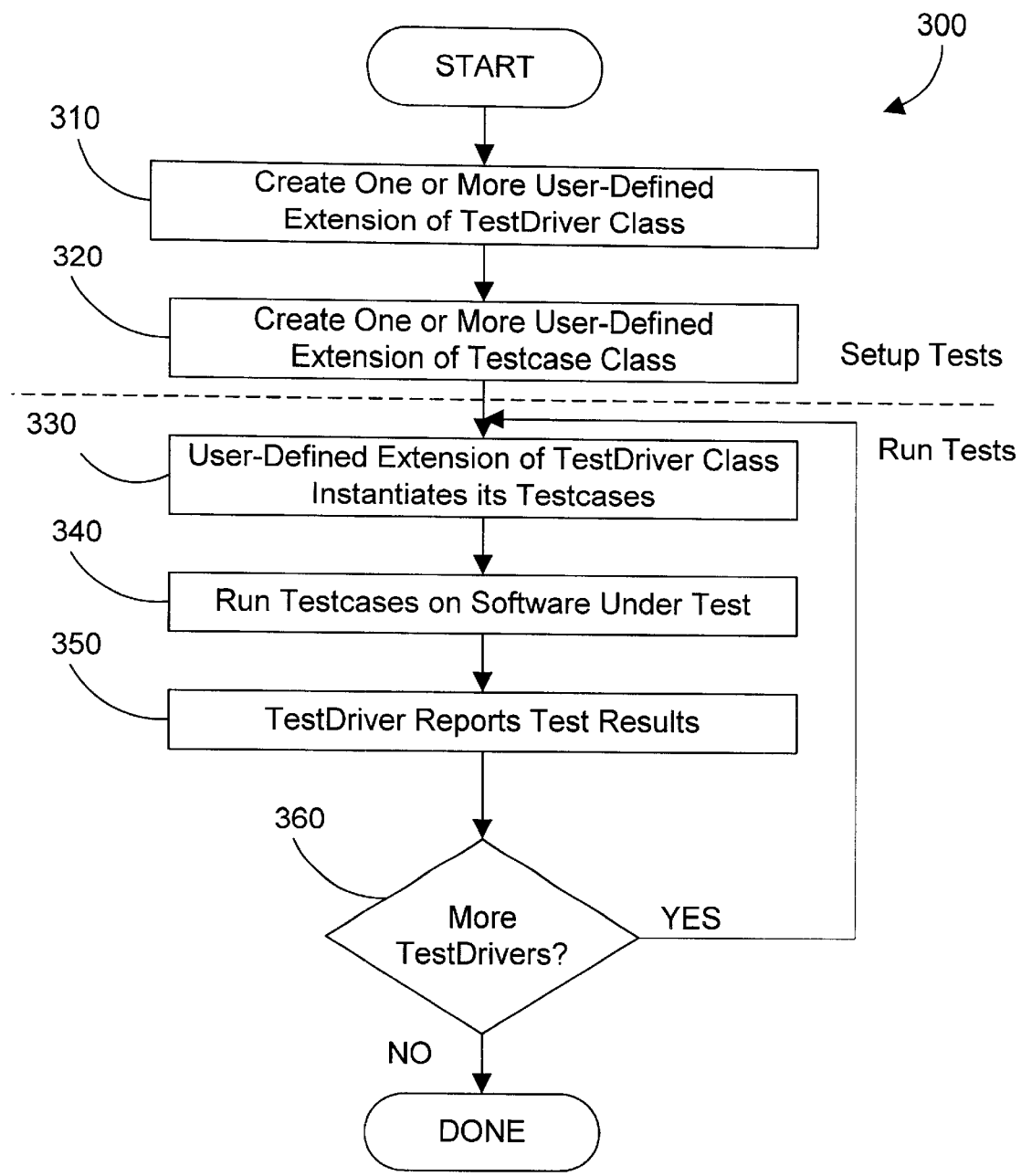
FIG. 3 is a flow diagram of a method for testing software in accordance with a preferred embodiment of the present invention.
Figure 4:
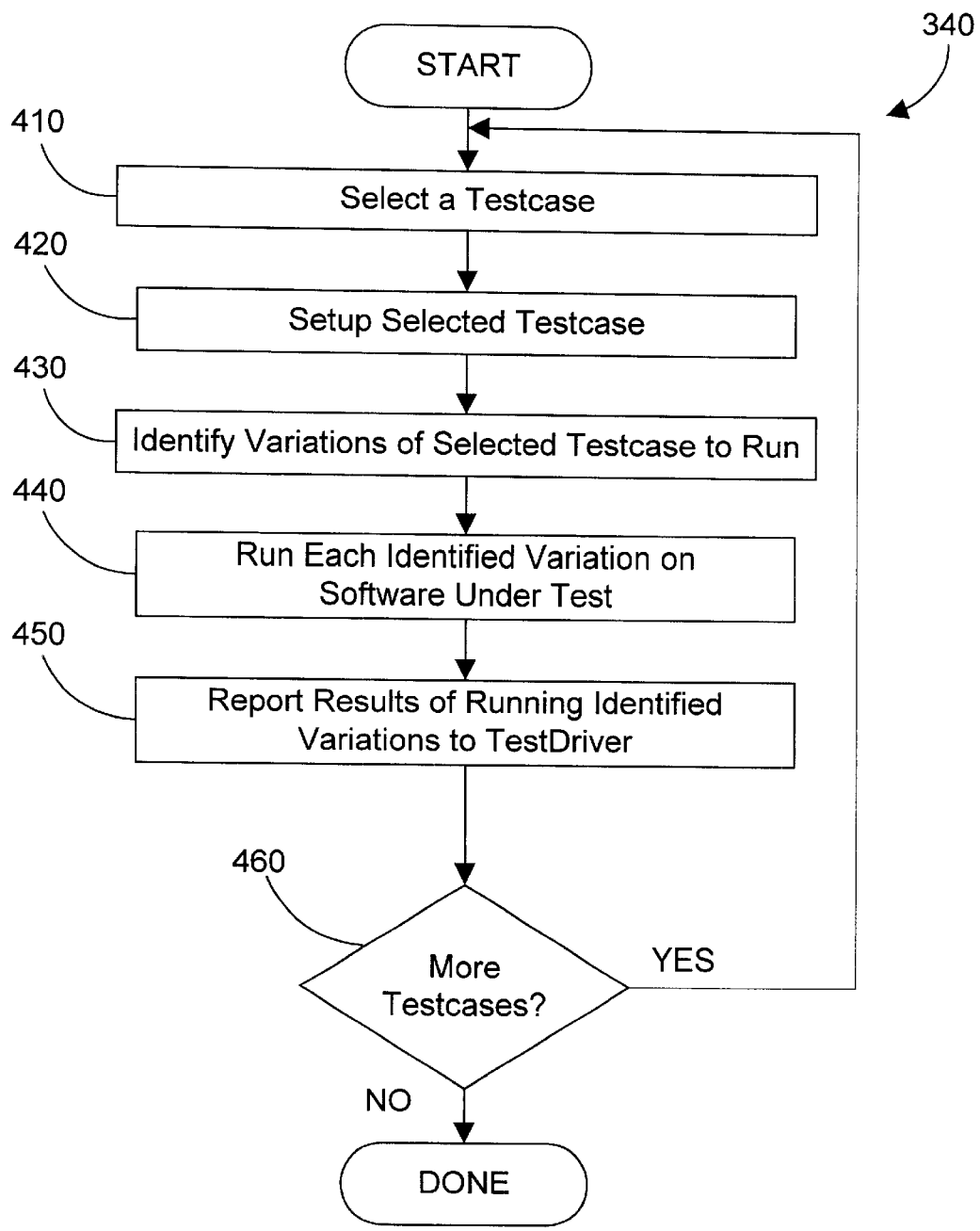
FIG. 4 is a flow diagram of the steps used to carry out the running of the testcases in step 340 of FIG. 3.

The details of step 340 of FIG. 3 are shown in FIG. 4. First, one of the testcases that were instantiated in step 330 is selected (step 410). For the example of FIG. 2, we assume the DBQueryTestcase testcase is selected first in step 410. Next, the selected testcase is setup (step 420). For the DBQueryTestcase of FIG. 2, the testcase is setup by invoking its setup( ) method. Setup may include creating any necessary system objects needed by the testcase variations. For the example of FIG. 4, invoking setup( ) on DBQueryTestcase might create a table called DBQTest1 and populate it with sample data. Next, the variations of the selected testcase that need to be run are identified (step 430). The number of variations on a testcase class can easily be determined if the testcase is programmed in an object oriented language (such as Java) that supports reflection by: 1) providing a separate method for invoking each variation; and 2) using a "reflection" method that causes an object to return a list of its methods. In this manner, an instance of the DBTestDriver class of FIG. 2 can identify which variations need to be run by using reflection on each of the testcase instances. For the DBQueryTestcase, the reflection causes it to return a list of all its methods, and the DBTestDriver class includes the logic to filter from that list all variations of the testcase. One way to make filtering easy is to provide a predefined prefix for all testcase variations, such as "var". In this manner, the DBTestDriver instance can determine from the list of methods that var001( ), var002( ) and var003( ) are methods that invoke three different variations of the DBQueryTestcase. Not all variations need necessarily be run, and DBTestDriver will preferably include logic to determine which of these variations should be run on the software under test.

Once the variations to be run are identified in step 430, each of these variations are run on the software under test (step 440). Each of these variations reports its test results to the test driver (step 450). Thus, for the example of FIG. 2, we assume that the variations var001 and var003 need to be run on the software under test, so the DBTestDriver instance invokes the var001( ) and var003( ) methods on the DBQueryTestcase. Each of these methods return the status of their tests to DBTestDriver in step 450. If all testcases have been considered (step 460=NO), step 340 is complete. Otherwise (step 460=YES), step 340 loops back and selects the next testcase for processing (step 410), and performs steps 420–450 on the newly selected testcase. This continues until all testcases have been processed (step 460=NO).

Figure 5:
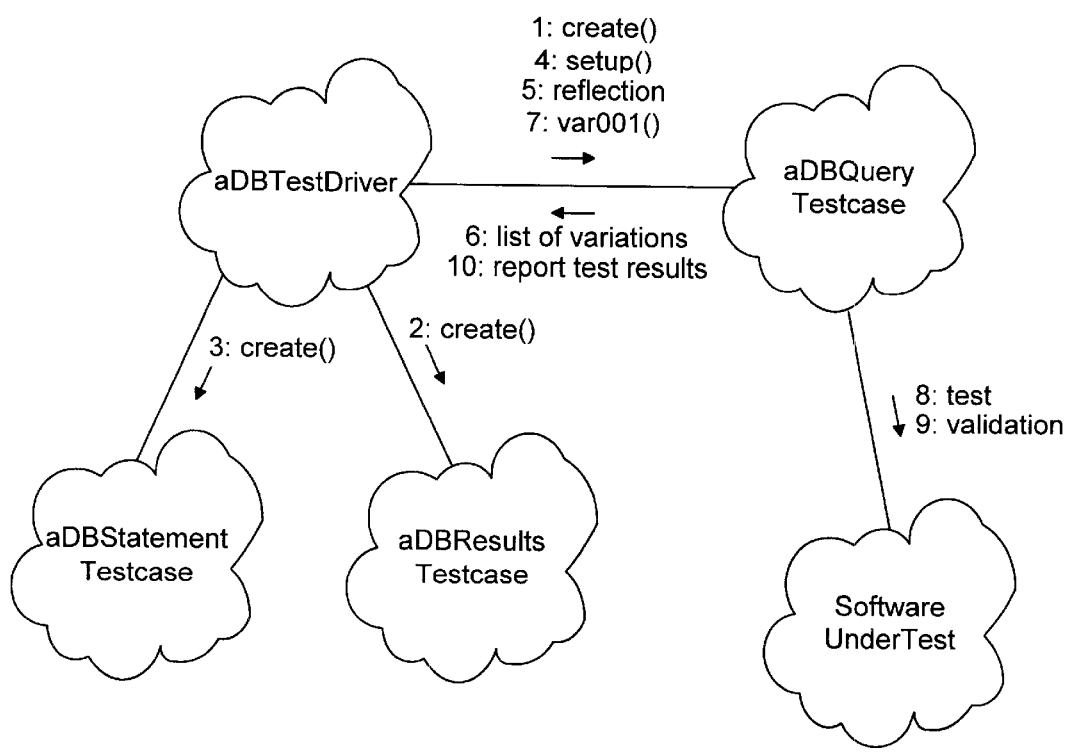
FIG. 5 is an object diagram that includes the steps in accordance with the preferred embodiments to run variation var001 of the DBQueryTestcase shown in FIG. 4.

The function of an extended framework and its correspondence with the method steps of FIGS. 3 and 4 is best understood with reference to the object diagram of FIG. 5. The object diagram of FIG. 5 assumes that steps 310 and 320 of FIG. 3 were previously performed, and that an instance of the TestDriver class, called aDBTestDriver in FIG. 5, has been created. In step 330 of FIG. 3, the test driver then instantiates its testcases, preferably from its own internal list of applicable testcases. We assume for the example of FIG. 2 that the DBTestDriver lists the DBQueryTestcase, the DBResultsTestcase, and the DBStatementTestcase as the testcases to instantiate. The instantiation of these objects is shown in FIG. 5 by the aDBTestDriver object invoking the constructor methods, shown as create( ), on the DBQueryTestcase class (step 1), the DBResultsTestcase class (step 2), and the DBStatementTestcase class (step 3), which instantiates the respective instances aDBQueryTestcase, aDBResultsTestcase, and aDBStatementTestcase. Next, the appropriate testcases need to be run in step 340 of FIG. 3, which is shown in more detail in FIG. 4. First, a testcase is selected (step 410). We assume that the aDBQueryTestcase is initially selected. Next, this testcase is setup (step 420) by invoking the setup( ) method on the aDBQueryTestcase object (step 4 of FIG. 5). Next, the variations of the selected testcases that need to be run on the software under test are identified (step 430). This identification of testcase variations to be run is performed using the "reflection" function in Java, which returns the methods on an object. Thus, in step 5 of FIG. 5, the aDBTestDriver object performs reflection on the aDBQueryTestcase object, and in return, the list of methods on the aDBQueryTestcase is returned to the aDBTestDriver object in step 6, which includes methods to invoke all variations of the testcase. The aDBTestDriver object contains the logic to determine which of these methods are used to invoke testcase variations, and which of these testcase variations should be invoked. We assume that the var001 and var003 variations of aDBQueryTestcase need to be run on the software under test. In step 440 of FIG. 4, the first of these, var001, is initially run by invoking the var001( ) method on the aDBQueryTestcase object in FIG. 5 (step 7). The aDBQueryTestcase object then performs the testing (step 8) and any needed validation (step 9) for the testcase variation varOO1. Once the testing and validation in steps 8 and 9 are complete, the results of running the varOOI variation of aDBQueryTestcase are reported to the test driver (step 450), as shown by the aDBQueryTestcase object of FIG. 5 reporting the test results to the aDBTestDriver object in step 10. Note that steps 7–10 of FIG. 5 are then repeated for var003, which repeats steps 440 and 450 in FIG. 4 for this particular testcase variation. At this point there are still two other testcases to process (step 460=YES in FIG. 4) because the aDBResultsTestcase and aDBStatementTestcase have not yet been processed. Steps 5 and 6 will then be repeated for the next of these testcases to be processed, followed by steps 7–10 for each variation on that testcase that needs to be run, and these steps are then repeated for the last testcase. At this point, there are no more testcases to process (step 460=NO), so step 340 is complete. Finally, the test driver reports the results of running the testcases (step 350). The aDBTestDriver is the only test driver to be processed (step 360=NO), so method 300 is done.

In one alternative embodiment of the present invention, the TestDriver class reads an external file to identify the applicable testcases to run rather than maintaining an internal list of testcases. By placing the list of applicable testcases in a file, the tests to be performed may be modified without even changing the test code. If one of the testcases is to be deleted and two new test cases need to be added, these changes are made to the file that contains the list of applicable testcases, and the test code remains unchanged. By placing the testcase list in an external file, testing of the software under test may be modified by simply changing the external file, without requiring recompilation of the test code.

One of the important features of providing software test framework 126 is that it now becomes possible for an application programmer to easily generate test code for their applications using the same program development tools they use for application development. Another important benefit is available if the software test framework 126 is implemented in Java. The Java programming language is somewhat self-documenting, provided the programmer adheres to certain minimal criteria for commenting when developing code. Instead of having to manually update documentation for the test code that can quickly become out of date, documentation for test code implemented in Java using the software test framework 126 can easily and accurately be generated at any time using the Javadoc capability of Java, which automatically generates documentation that exactly corresponds to the code. In this manner, the documentation for the test code can be kept current by automatically generating the documentation as needed after changes have been made to the test code.

Another advantage of software test framework 126 is that testcases may be easily ported to new software under test. For example, if an application programmer is programming an application in Java, and needs to create the application as both an application and an applet, software test framework 126 would allow testcases developed to test the application to also be used to test the applet as well.

The present invention thus provides a consistent approach for generating test code for testing object oriented software. By providing predefined classes in the software test framework, and burying the core functions of the framework so these functions are performed "under the covers" (i.e., these functions are performed by the framework without requiring the user to define these functions) the framework allows a test programmer to concentrate on the generation of testcases rather than worrying about the low-level functions of test code. The result is test code that is uniform, and testcases that can easily be ported to different platforms and that can be easily adapted to different software under test. All that is required of the test programmer is to 1) extend the predefined TestDriver class in the framework, putting in this extension the logic for determining which testcases apply to that test driver and which variations of these testcases are to be applied, and 2) extend the predefined Testcase class in the framework to generate the desired testcases and any desired variations of these testcases. In addition, as mentioned above, if the framework is programmed in the same object oriented programming language as the software under test, the application programmer is already familiar with the standard programming tools for developing the software under test, and these same tools may now be efficiently used to generate the test code as well.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims.

We claim:

1. An apparatus comprising:
    at least one processor;
    a memory coupled to the at least one processor; and
    an object oriented software test framework residing in the memory and executed by the at least one processor, the software test framework including at least one test driver and a plurality of testcases for each test driver, the test driver running a selected subset of the plurality of testcases on object oriented software under test, the test driver comprising a user-defined extension of a test driver class defined by the software test framework.

2. The apparatus of claim 1 wherein the test driver class defines:
    at least one test driver object; and
    a first set of object methods to instantiate and run at least one of the plurality of testcases on the object oriented software under test.

3. The apparatus of claim 1 wherein the framework includes a testcase class that defines:
    at least one testcase object; and
    a second set of object methods to perform a plurality of functions with respect to the at least one testcase object.

4. The apparatus of claim 3 wherein the second set of object methods includes at least one method independently selected from the group:
    setup, cleanup, succeeded, failed, not applicable, assert, and exception.

5. The apparatus of claim 1 wherein each testcase includes at least one variation, and wherein the framework mechanism defines a mechanism for determining the variations for at least one testcase.

6. The apparatus of claim 5 wherein the mechanism for determining the variations comprises a reflection function defined in the Java programming language.

7. The apparatus of claim 5 wherein the test driver runs a plurality of the variations for at least one testcase on the object oriented software under test.

8. The apparatus of claim 1 wherein the object oriented software test framework comprises program code written in the same object oriented programming language as the object oriented software under test.

9. An apparatus comprising:
    at least one processor;
    a memory coupled to the at least one processor;
    object oriented software under test residing in the memory;
    at least one test driver instance of a user-defined extension of a predefined test driver class residing in the memory;
    each test driver instance instantiating a plurality of testcase instances, each testcase instance comprising a user-defined extension of a predefined testcase class residing in the memory, each testcase instance including at least one variation; the test driver instance identifying which of the variations to run on the object oriented software under test, each test driver instance running the identified variations on the object oriented software under test.

10. A method for testing object oriented software under test, the method comprising the steps of:
    generating a user-defined extension of a predefined test driver class;
    providing a plurality of testcases for each test driver;
    invoking the at least one test driver to run a selected subset of testcases on the object oriented software; and
    reporting the results of running the selected subset of testcases on the object oriented software.

11. The method of claim 10 wherein the step of providing the plurality of testcases comprises the steps of generating a plurality of user-defined extensions of a predefined testcase class.

12. The method of claim 10 wherein the at least one test driver determines which of the plurality of testcases to run on the object oriented software.

13. The method of claim 10 wherein each testcase includes at least one variation, the method further comprising the step of determining the variations for at least one testcase.

14. The method of claim 13 wherein the mechanism for determining the variations comprises a reflection function defined in the Java programming language.

15. A method for testing object oriented software under test, the method comprising the steps of:
    providing an object oriented software test framework, the software test framework including a predefined test driver class and a predefined testcase class written in the same object oriented programming language as the object oriented software under test;
    extending the software test framework by providing at least one user-defined extension to the test driver class and by providing at least one user-defined extension to the testcase class, each user-defined extension to the testcase class defining at least one testcase variation, each testcase variation comprising a separate test that may be performed on the object oriented software under test;

creating a test driver instance of the user-defined extension to the test driver class;

the test driver instance creating at least one testcase instance of at least one user-defined extension to the testcase class;

the test driver instance identifying the testcase variations for each testcase instance;

the test driver instance running at least one of the testcase variations on the object oriented software under test; and the at least one testcase variation reporting results of running its testcase variation to the test driver instance.

16. A program product comprising:

(A) an object oriented software test framework including at least one test driver and a plurality of testcases for each test driver, the test driver running a selected subset of the plurality of testcases on object oriented software under test, the test driver comprising a user-defined extension of a test driver class defined by the software test framework; and (B) computer-readable signal bearing media bearing the software test framework.

17. The program product of claim 16 wherein the computer-readable signal bearing media comprises recordable media.

18. The program product of claim 16 wherein the computer-readable signal bearing media comprises transmission media.

19. The program product of claim 16 wherein the test driver class defines:

at least one test driver object; and a first set of object methods to instantiate and run at least one of the plurality of testcases on the object oriented software under test.

20. The program product of claim 16 wherein the software test framework includes a testcase class that defines:

at least one testcase object; and a second set of object methods to perform a plurality of functions with respect to the at least one testcase object.

21. The program product of claim 20 wherein the second set of object methods includes at least one method independently selected from the group:

setup, cleanup, succeeded, failed, not applicable, assert, and exception.

22. The program product of claim 16 wherein each testcase includes at least one variation, and wherein the framework mechanism defines a mechanism for determining the variations for at least one testcase.

23. The program product of claim 22 wherein the mechanism for determining the variations comprises a reflection function defined in the Java programming language.

24. The program product of claim 22 wherein the test driver runs a plurality of the variations for at least one testcase on the object oriented software under test.

25. The program product of claim 16 wherein the software test framework comprises program code written in the same object oriented programming language as the object oriented software under test.

26. A program product comprising:

(A) an object oriented software test framework for testing object oriented software under test, the software test framework including:

at least one test driver instance of a user-defined extension of a predefined test driver class;

each test driver instance instantiating a plurality of testcase instances, each testcase instance comprising a user-defined extension of a predefined testcase class residing in the memory, each testcase instance including at least one variation; the test driver instance identifying which of the variations to run on the object oriented software under test, each test driver instance running the identified variations on the object oriented software under test; and (B) computer-readable signal bearing media bearing the software test framework.

27. The program product of claim 26 wherein the computer-readable signal bearing media comprises recordable media.

28. The program product of claim 26 wherein the computer-readable signal bearing media comprises transmission media.

* * * * *